(12) United States Patent
Labrie

(10) Patent No.: US 12,269,687 B2
(45) Date of Patent: Apr. 8, 2025

(54) PLANK POSITIONING MECHANISM

(71) Applicant: Carbotech International, Plessisville (CA)

(72) Inventor: Jonatan Labrie, Saint-Henri-de-Lévis (CA)

(73) Assignee: CARBOTECH INTERNATIONAL, Plessisville (CA)

( * ) Notice: Subject to any disclaimer, the term of this patent is extended or adjusted under 35 U.S.C. 154(b) by 227 days.

(21) Appl. No.: 17/982,885

(22) Filed: Nov. 8, 2022

(65) Prior Publication Data

US 2023/0219764 A1 Jul. 13, 2023

Related U.S. Application Data

(60) Provisional application No. 63/297,483, filed on Jan. 7, 2022.

(30) Foreign Application Priority Data

Sep. 30, 2022 (CA) .................................. CA 3178006

(51) Int. Cl.
   *B65G 15/28* (2006.01)
   *B27B 31/06* (2006.01)
   *B65G 47/82* (2006.01)
   *B65G 47/84* (2006.01)

(52) U.S. Cl.
   CPC .............. *B65G 15/28* (2013.01); *B27B 31/06* (2013.01); *B65G 47/82* (2013.01); *B65G 47/845* (2013.01); *B65G 47/844* (2013.01); *B65G 2201/0217* (2013.01); *B65G 2201/022* (2013.01); *B65G 2201/0282* (2013.01)

(58) Field of Classification Search
   CPC ...... B65G 15/28; B65G 47/82; B65G 47/845; B65G 47/844; B65G 2201/022; B65G 15/10; B65G 47/22; B65G 2201/0217; B65G 2201/0282; B27B 31/006; B27B 31/06
   USPC .......................... 198/370.02, 370.07, 370.08
   See application file for complete search history.

(56) References Cited

U.S. PATENT DOCUMENTS

| 3,538,963 A | 11/1970 | Adams |
| 3,791,518 A * | 2/1974 | Vanderhoof ............ B07C 5/362 209/552 |
| 4,184,395 A | 1/1980 | Blachly et al. |
| 4,330,019 A | 5/1982 | Murphy et al. |

(Continued)

FOREIGN PATENT DOCUMENTS

| CA | 2503980 A1 * | 10/2006 | ............ B27B 25/04 |
| WO | 2004067236 A1 | 8/2004 | |
| WO | 2009025565 A2 | 2/2009 | |

*Primary Examiner* — Mark A Deuble
(74) *Attorney, Agent, or Firm* — Benoit&Cote Inc.; Charles-Andre Caron

(57) ABSTRACT

A plank positioning mechanism is adapted to move planks traveling in a traveling direction on a conveyor. The plank positioning mechanism comprises a conveying means traveling parallel to the conveyor; and a plurality of paddle assemblies mounted equidistant to the conveying means perpendicular to the traveling direction. The paddle assemblies comprise a movable part; and a motor adapted to drive the movable part perpendicular to the conveyor, Thereby, the movable part is adapted to thrust the plank perpendicular to its traveling direction as the paddle assembly travel parallel to the board.

20 Claims, 16 Drawing Sheets

(56) References Cited

U.S. PATENT DOCUMENTS

| | | | |
|---|---|---|---|
| 4,452,117 A | 6/1984 | Brickner et al. | |
| 4,960,023 A | 10/1990 | Reuter et al. | |
| 5,421,228 A | 6/1995 | Fukinuki | |
| 5,623,860 A | 4/1997 | Schoene et al. | |
| 5,911,302 A * | 6/1999 | Jackson | B27B 31/06 198/456 |
| 5,921,378 A * | 7/1999 | Bonnet | B65G 17/08 198/850 |
| 6,279,441 B1 | 8/2001 | Streblow | |
| 6,305,259 B1 | 10/2001 | Whitworth et al. | |
| RE38,122 E | 5/2003 | Kondo et al. | |
| 6,631,661 B2 | 10/2003 | Brunson | |
| 6,802,412 B2 * | 10/2004 | Lapeyre | B65G 47/844 198/370.02 |
| 7,377,376 B2 * | 5/2008 | Hannebauer | B27B 31/06 198/456 |
| 7,410,045 B2 * | 8/2008 | Patterson | B65B 35/405 198/370.07 |
| 7,562,761 B2 * | 7/2009 | Tasma | B65G 17/067 198/370.02 |
| 7,703,365 B2 | 4/2010 | Wight et al. | |
| 7,779,986 B2 * | 8/2010 | Enomoto | B65G 47/844 198/370.02 |
| 8,250,957 B2 | 8/2012 | Holmes et al. | |
| 8,439,183 B2 * | 5/2013 | Borne | B27B 1/007 198/457.06 |
| 8,490,777 B2 * | 7/2013 | Wight | B27B 31/006 198/452 |
| 10,377,580 B2 * | 8/2019 | Monti | B65G 47/845 |
| 2004/0089125 A1 | 5/2004 | Schoene et al. | |

* cited by examiner

PLANK POSITIONING MECHANISM

CROSS-REFERENCE TO RELATED APPLICATIONS

This application relates to and is a non-provisional application claiming priority under 35 U.S.C. § 119(a) from CA patent application Ser. No. 3,178,006, filed Sep. 30, 2022, entitled PLANK POSITIONING MECHANISM, and is further claiming priority under 35 U.S.C. § 119(e) from U.S. provisional patent application Ser. No. 63/297,483, entitled PLANK POSITIONING MECHANISM, the specifications of which are hereby incorporated herein by reference in their entirety.

BACKGROUND

(a) Field

The present description relates to industrial machinery used in wood mills. More particularly, the present description relates to a plank positioning mechanism.

(b) Related Prior Art

It is well known in the art that in a sawmill or a lumber mill, transportation of the longitudinal pieces of lumber requires the use of conveyors. Usually, the longitudinal pieces of lumber emerge from the mill in random order onto a feeding conveyor. Certain given stages of the transformation process require that the longitudinal pieces of lumber be aligned on a conveyor. It is therefore necessary to provide a system for aligning the pieces of lumber without decreasing the conveyor speed. In order to be efficient, lumber transfer systems should allow handling and transfer of any type, size, and shape of longitudinal pieces of lumber such as stem, saw log, wood plank, beam and the like. Furthermore, they should also allow a high transfer rate of longitudinal pieces of lumber. In fact, the efficiency of a lumber mill generally depends greatly on the production rate attainable. The number of longitudinal pieces of lumber transferred per minute is thus a factor affecting greatly the production rate of lumber mills.

Examples of transfer lumber systems known to the Applicant are described in the following Canadian patents and/or patent applications: 1,171,020; 1,228,873; 2,133,927; 2,148,322; 2,151,768; 2,185,609; 2,185,620; 2,238,231; 2,271,175; and 2,577,656. Additionally, following U.S. patents also describe transfer lumber systems: U.S. Pat. Nos. 267,991, 3,147,842, 4,869,360, 4,945,976, 5,419,425, 5,518,106, 5,662,203, 6,564,926, 6,702,096, 6,956,197, and 8,104,604B2.

Examples of positioning systems known to the Applicant are described in the following Canadian patents and/or patent applications: 2,311,406; 2,503,980; 2,191,389; 2,236,508; 3,055,780; and 2,292,567.

Hence, in light of the aforementioned issues, there is a need for an improved system which, by virtue of its design and components, would be able to operate in the aforementioned conditions with upmost efficiency.

SUMMARY OF THE INVENTION

In some aspects, the techniques described herein relate to a plank positioning mechanism adapted to thrust a plank traveling in a traveling direction on a conveyor in a thrust direction perpendicular to the conveyor traveling direction, the plank positioning mechanism including: a pair of chains traveling parallel to the conveyor traveling direction; and at least one paddle assembly mounted to the pair of chains, including a movable part adapted to be movable in the thrust direction; and a motor adapted to drive the movable part in the thrust direction, wherein the movable part is adapted to thrust the plank in the thrust direction while the plank being conveyed by the conveyor.

In some aspects, the techniques described herein relate to a plank positioning mechanism adapted to thrust a plank traveling in a conveyor traveling direction on a conveyor in a thrust direction perpendicular to the conveyor traveling direction, the plank positioning mechanism, including: conveying means traveling parallel to the conveyor traveling direction; and at least one paddle assembly mounted to the conveying means, including a movable part adapted to be movable in the thrust direction; and a motor adapted to drive the movable part in the thrust direction, wherein the movable part is adapted to thrust the plank in the thrust direction while the plank being conveyed by the conveyor.

In some aspects, the techniques described herein relate to a method of aligning planks traveling on a conveyor in a conveyor traveling direction, the method including: a) providing a plank positioning mechanism including: conveying means adapted to convey over a complementary path that is complementary and parallel to the conveyor travelling direction; and a plurality of paddle assemblies each controlled independently, each one of the paddle assemblies including a movable part adapted to be controllably driven to travel in a thrust direction perpendicular to the conveyor traveling direction, each one the paddle assemblies being conveyed over the complementary path by the conveying means; and b) when one of the paddle assemblies is travelling the complementary path, driving the movable part of the paddle assembly to an aligned position in the thrust direction, thereby thrusting a plank travelling aside the paddle assembly on the conveyor in the thrust direction into the aligned position.

In some aspects, the techniques described herein relate to a conveyor system including: a plank conveyor having an upstream extremity, a downstream extremity according to a conveyor traveling direction, and a plank conveying surface in-between, the plank conveyor being adapted to receive planks about its upstream extremity and to convey the planks to its downstream extremity; and a plank positioning mechanism installed about the plank conveying surface, the plank positioning mechanism including: conveying means traveling in the conveyor traveling direction about the plank conveying surface; and at least one paddle assembly mounted to the conveying means, including: a movable part adapted to be movable in a thrust direction perpendicular to the conveyor traveling direction; and a motor adapted to drive the movable part in the thrust direction, wherein the movable part is adapted to thrust the plank in the thrust direction while the plank being conveyed by the conveyor.

BRIEF DESCRIPTION OF THE DRAWINGS

Further features and advantages of the present disclosure will become apparent from the following detailed description, taken in combination with the appended drawings, in which.

It will be noted that throughout the appended drawings, like features are identified by like reference numerals.

DETAILED DESCRIPTION

The realizations will now be described more fully hereinafter with reference to the accompanying figures, in which realizations are illustrated. The foregoing may, however, be embodied in many different forms and should not be construed as limited to the illustrated realizations set forth herein.

With respect to the present description, references to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

Recitation of ranges of values and of values herein or on the drawings are not intended to be limiting, referring instead individually to any and all values falling within the range, unless otherwise indicated herein, and each separate value within such a range is incorporated into the specification as if it were individually recited herein. The words "about", "approximately", or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described realizations. The use of any and all examples, or exemplary language ("e.g.," "such as", or the like) provided herein, is intended merely to better illuminate the exemplary realizations and does not pose a limitation on the scope of the realizations. No language in the specification should be construed as indicating any unclaimed element as essential to the practice of the realizations. The use of the term "substantially" is intended to mean "for the most part" or "essentially" depending on the context. It is to be construed as indicating that some deviation from the word it qualifies is acceptable as would be appreciated by one of ordinary skill in the art to operate satisfactorily for the intended purpose.

In the following description, it is understood that terms such as "first", "second", "top", "bottom", "above", "below", and the like, are words of convenience and are not to be construed as limiting terms.

Figure 1:
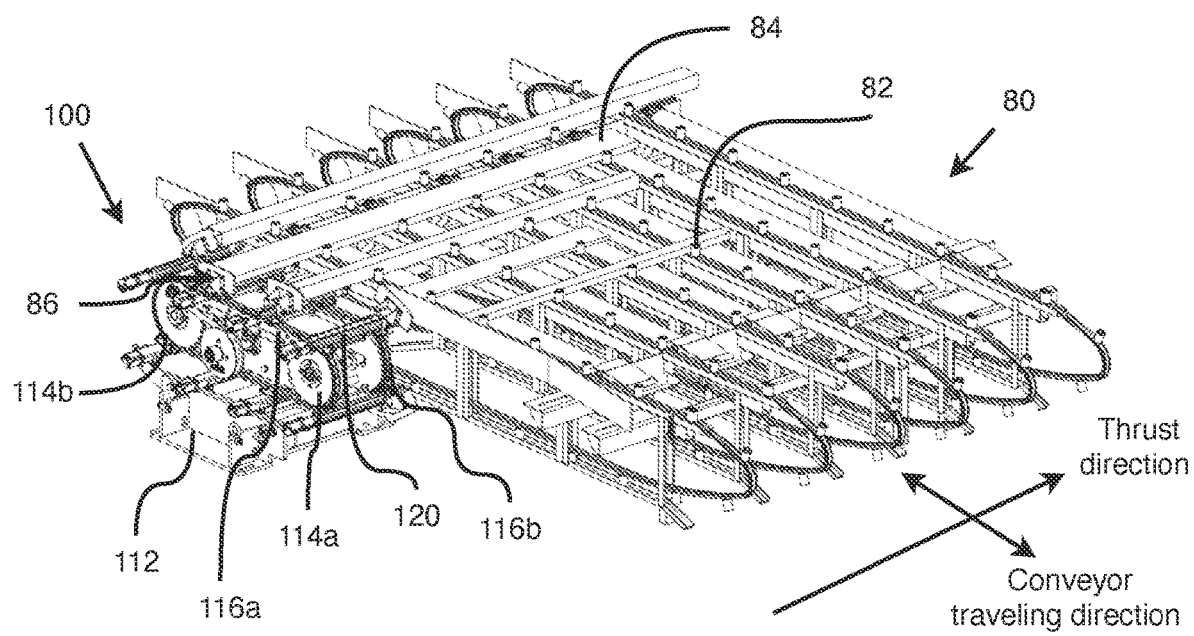
FIG. 1 is a perspective elevated view from a point of view at 45 degrees upstream in the thrust direction of a plank positing mechanism aside a wood board feeding system in accordance with an embodiment, depicting a board before entering the complemented path, boards of different dimensions being thrusted to desired positions during their travel in the complemented path, and a board once past the complemented path.
Figure 2:
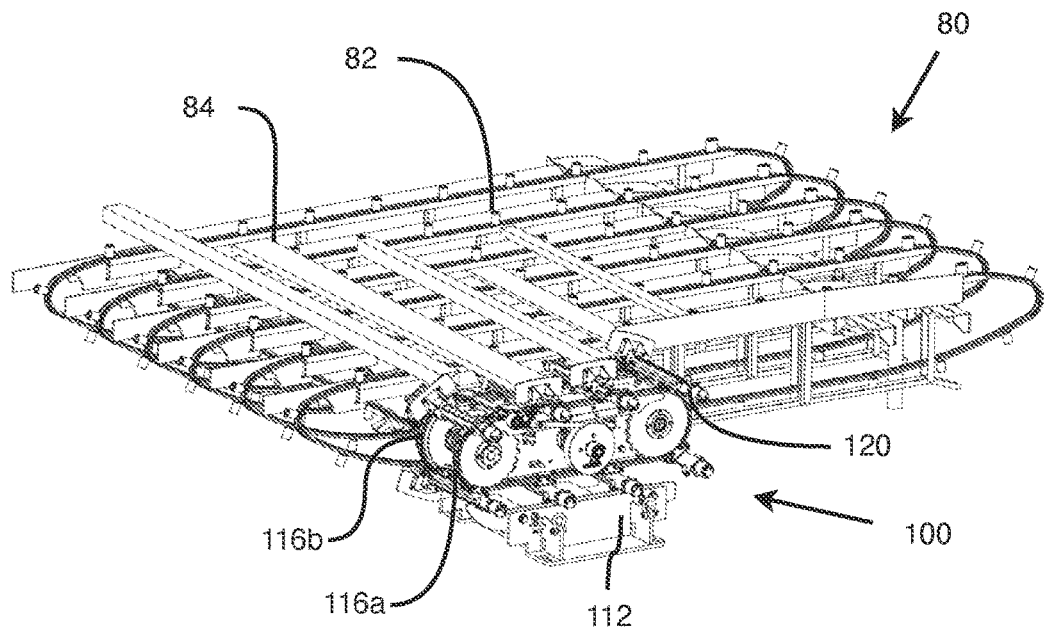
FIG. 2 is a perspective elevated view from a point of view at 30 degrees upstream in the thrust direction of a plank positing mechanism aside a wood board feeding system in accordance with an embodiment, depicting a board before entering the complemented path, boards of different dimensions being thrusted to desired positions during their travel in the complemented path, and a board once past the complemented path.

The terms "top", "up", "upper", "bottom", "lower", "down", "vertical", "horizontal", "interior" and "exterior" and the like are intended to be construed in their normal meaning in relation with normal installation of the product, with indication of normal orientation of the components being provided, inter alia, on FIG. 1.

It should further be noted that for purposes of this disclosure, the term "coupled" means the joining of two members directly or indirectly to one another. Such joining may be stationary in nature or movable in nature and/or such joining may allow for the flow of fluids, electricity, electrical signals, or other types of signals or communication between two members. Such joining may be achieved with the two members or the two members and any additional intermediate members being integrally formed as a single unitary body with one another or with the two members or the two members and any additional intermediate members being attached to one another. Such joining may be permanent in nature or alternatively may be removable or releasable in nature otherwise expressively stated.

FIGS. 1 to 6 show views of a preferred embodiment of the positioning mechanism 100 of the present invention in operating condition aside a wood board feeding system 80. FIG. 1 depicts the conveyor traveling direction in which the boards travel, and the thrust direction in the positioning mechanism 100 thrust the boards to align them. The positioning mechanism 100 has a pair of a continuous loop chains 116, i.e., a front chain 116a and a rear chain 116b, each mounted to a pair of cogwheels 114a, 114b, aka downstream cogwheel having a common shaft 182 (or coaxial shafts) and an upstream cogwheels having independent and aligned shafts 184 (see FIG. 19), operating together as a conveying means, and supported by a frame assembly 112, with the cowheels 114a being driven by a conveying motor (not shown). To the continuous loop chains 116 are mounted a plurality of paddle assemblies 120 that are individually driven and that are adapted to displace boards, aka planks, as the boards are moved by and over the wood board feeding system 80, for example the one described in U.S. Pat. No. 5,662,203.

According to an alternative embodiment (not depicted), belts and preferably toothed belts are used as conveying means instead of chains 116.

More precisely, each of the paddle assemblies 120 are mounted for laterally thrusting a board so that the close extremity of the board becomes aligned to a target position as the board moves over the wood board feeding system 80.

Practically, the positioning mechanism 100 and the wood board feeding system 80 are respectively equipped with generally equidistant paddle assemblies 120 and grasping arms 82, with the displacement of the paddle assemblies 120 and the grasping arms 82 being synchronized with each other so that each board pushed by a series of grasping arms 82 on the wood board feeding system 80 is aligned with a paddle assembly 120. As a board is displaced over the wood board feeding system 80, the paddle assemblies 120, driven by the chains 116, are moved in a sync fashion over a complementary path 156 parallel to the traveling path 90 of the board (that can be divided in a pre-complemented path 96, a complemented path 94 and a post-complemented path 92 as identified on FIG. 5. The complementary path 156 is delimited in its length by the distance between the cogwheels 114. During the travel of the board over the complemented path 94, the paddle assemblies 120 traveling the complementary path 156 are adapted to exert a correction based on a maximum correction path 158 to the board, perpendicular to the complementary path 156. Therefore, during the complemented path 94, the position of the board 84 is corrected, i.e., the position of the extremity 86, to a target position, i.e., an aligned position.

Figure 3:
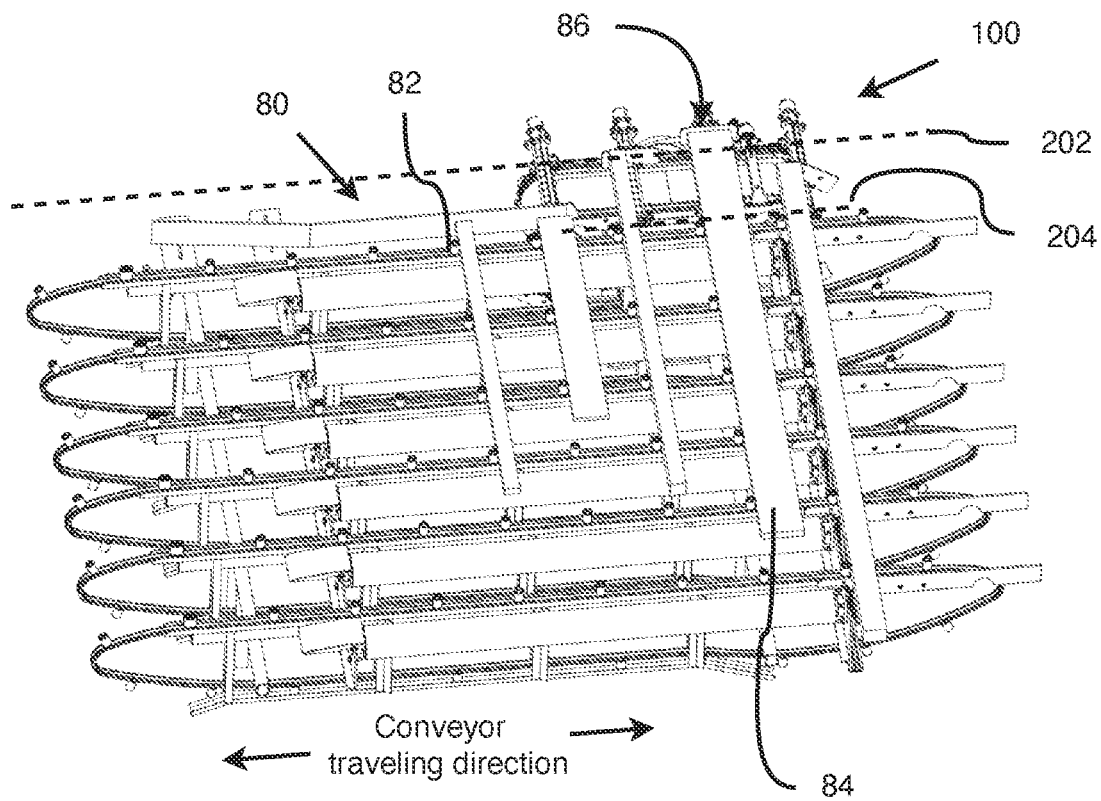
FIG. 3 is an almost plan view of a plank positing mechanism aside a wood board feeding system in accordance with an embodiment, depicting a board before entering the complemented path, boards of different dimensions being thrusted to desired positions during their travel in the complemented path, and a board once past the complemented path.
Figure 4:
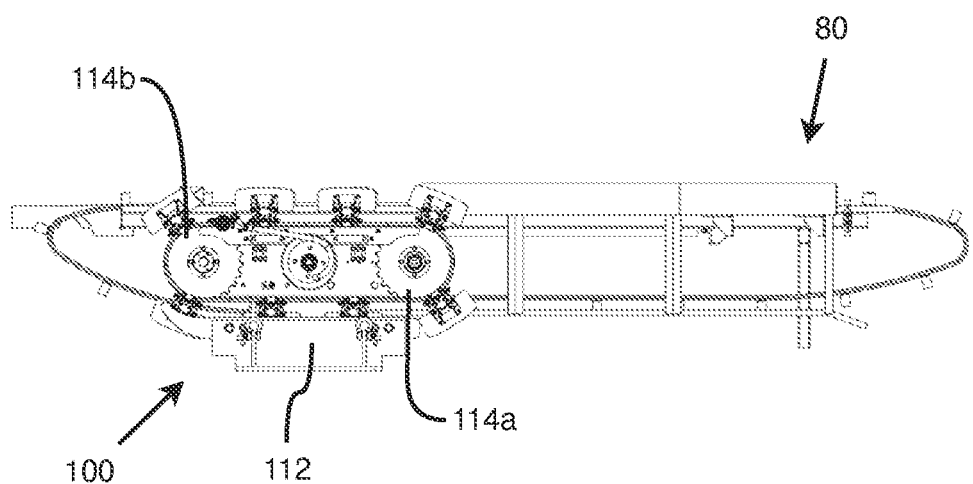
FIG. 4 is a side view of the plank positing mechanism and wood board feeding system depicted on FIGS. 1 to 3.
Figure 5:
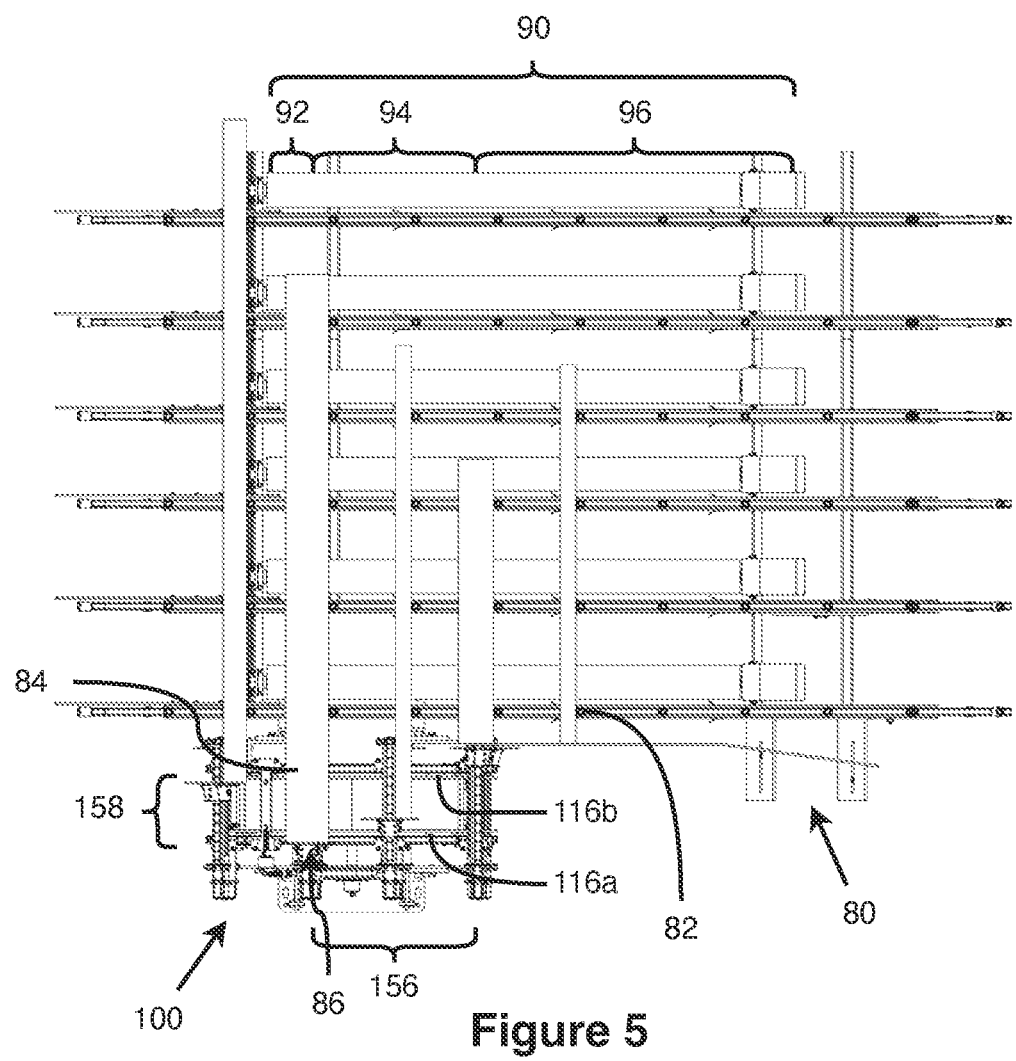
FIG. 5 is a plan view of the plank positing mechanism and wood board feeding system depicted on FIGS. 1 to 3.
Figure 6:
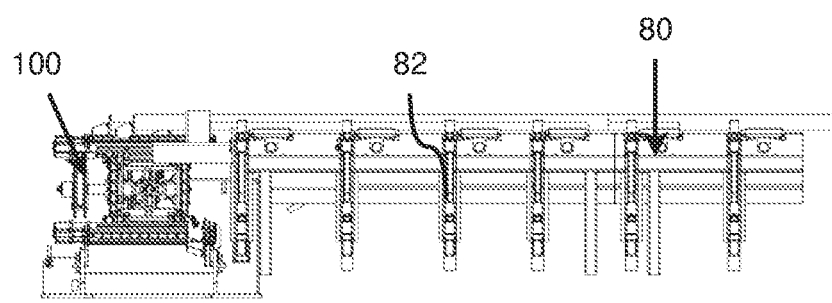
FIG. 6 is a back view of the plank positing mechanism and wood board feeding system on FIGS. 1 to 3 depicted side by side.
Figure 7:
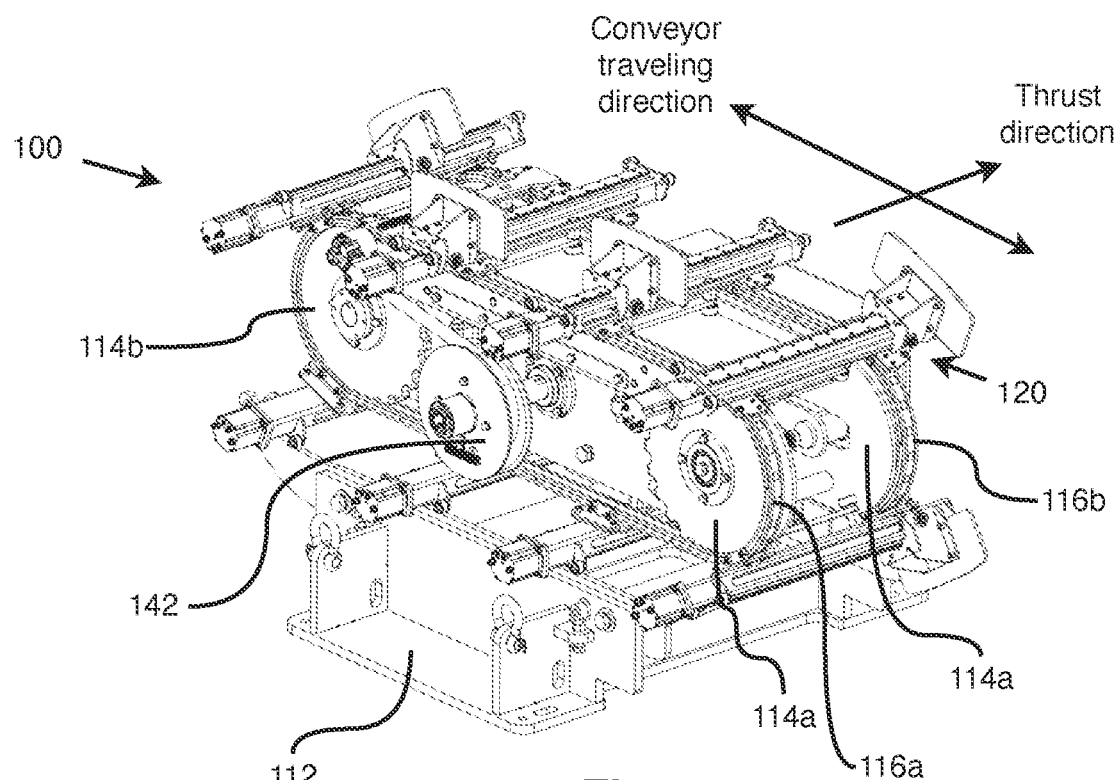
FIG. 7 is an elevated perspective view of the plank positioning mechanism from a point of view at 45 degrees upstream in the thrust direction.

Referring particularly to FIG. 3, the wood board feeding system 80 defines a conveying surface depicted below the limit line 202. The positioning mechanism 100 delimits a thrust surface depicted above the limit line 204. The thrust surface is delimited in the thrust direction by the displacement limits of the plank thrusting component, namely the paddle surface 136 (see FIG. 23) in its frontmost limit in the thrust direction, about or frontward from the aligned position, and in in rearmost limit opposed to the thrust direction, the latter being or being about the idle position of the paddle surface 136. Thus, as depicted, the conveying surface and the thrust surface are at least partially overlapping.

Referring to FIGS. 17 to 21, the positioning mechanism 100 comprises a frame assembly 112 on which are mounted the cogwheels 114. A chain 116 is mounted on each of the front pair of cogwheels 114 and rear pair of cogwheels 114, with the chains being driven synchronously by a conveying motor (not shown) driving the cogwheels 114b through shaft 182. Paddles assemblies 120 are mounted equidistant to each other perpendicular to the chains 116. A power hub assembly 142 is mounted substantially central to the positioning mechanism 100. The power hub assembly 142, extending outside the space between the front 116a and the rear chain 116b, is adapted to power up the paddle assemblies 120 all over their course.

Figure 8:
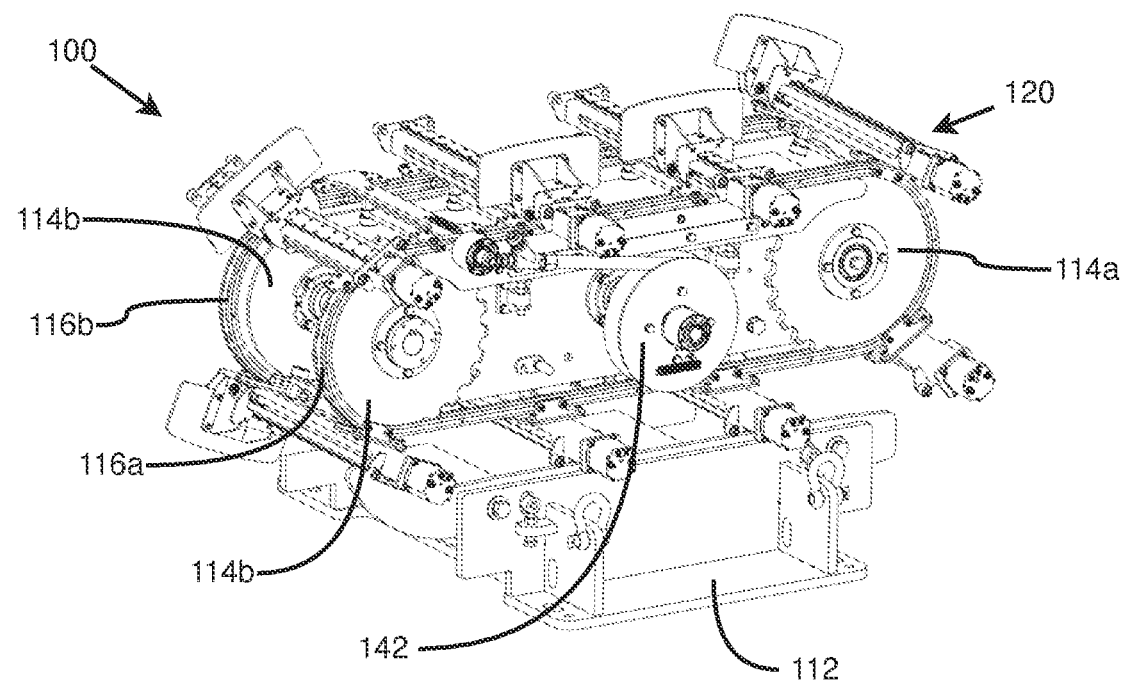
FIG. 8 is an elevated perspective view of the plank positioning mechanism from a point of view at 15 degrees downstream in the thrust direction.
Figure 9:
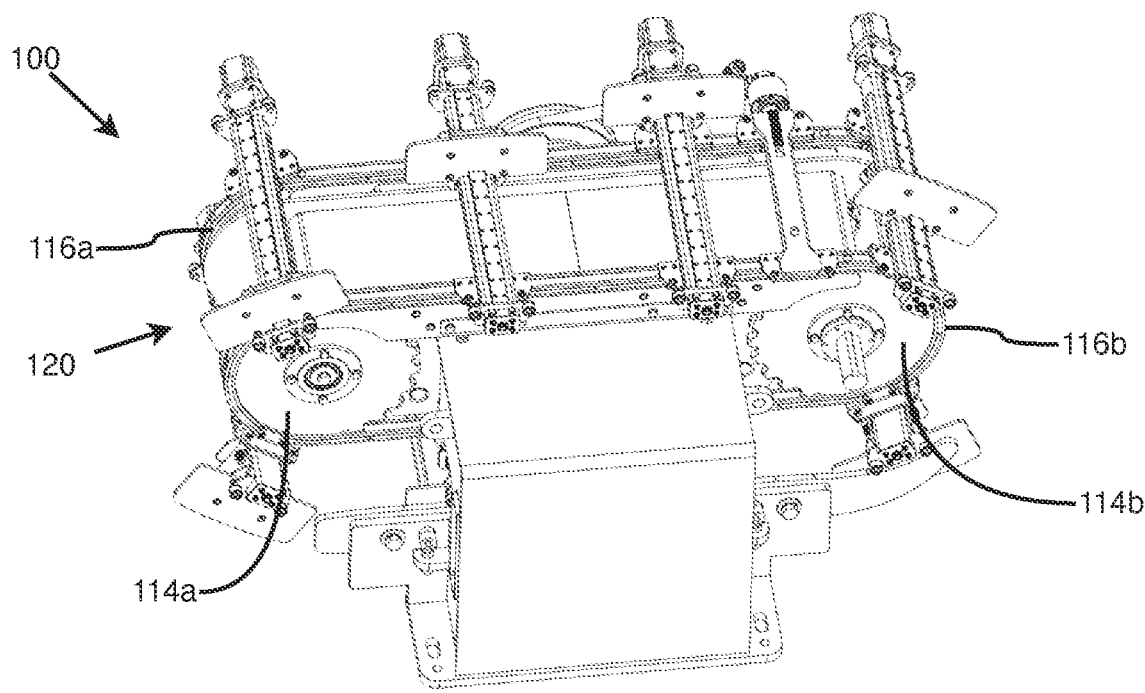
FIG. 9 is an elevated perspective views of the plank positioning mechanism from a point of view at 15 degrees upstream in the thrust direction.
Figure 10:
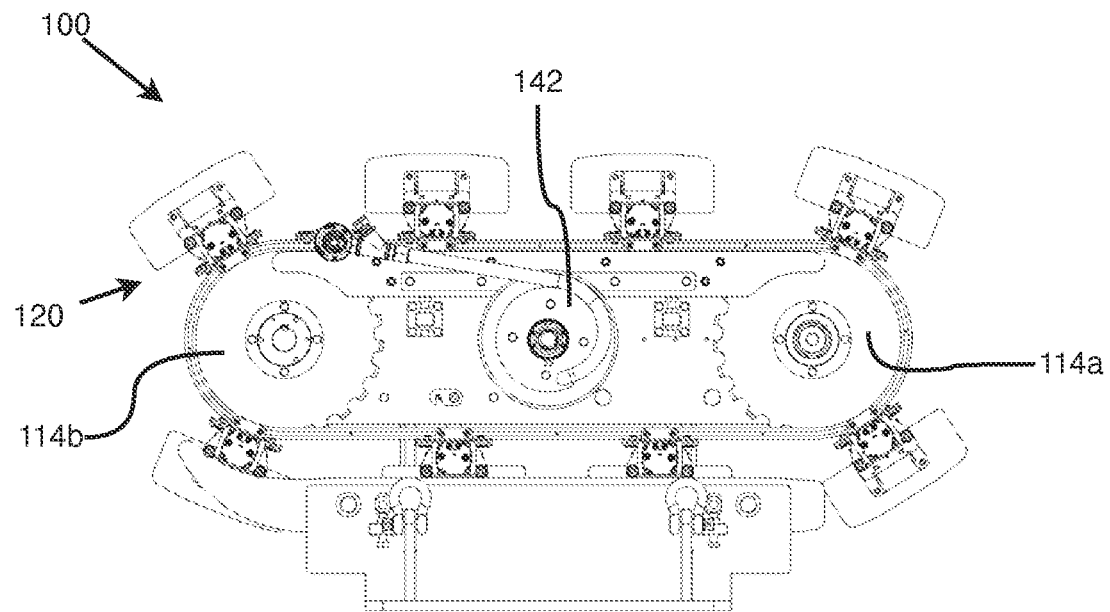
FIG. 10 is a side view of the plank positioning mechanism of FIGS. 7 to 9.
Figure 11:
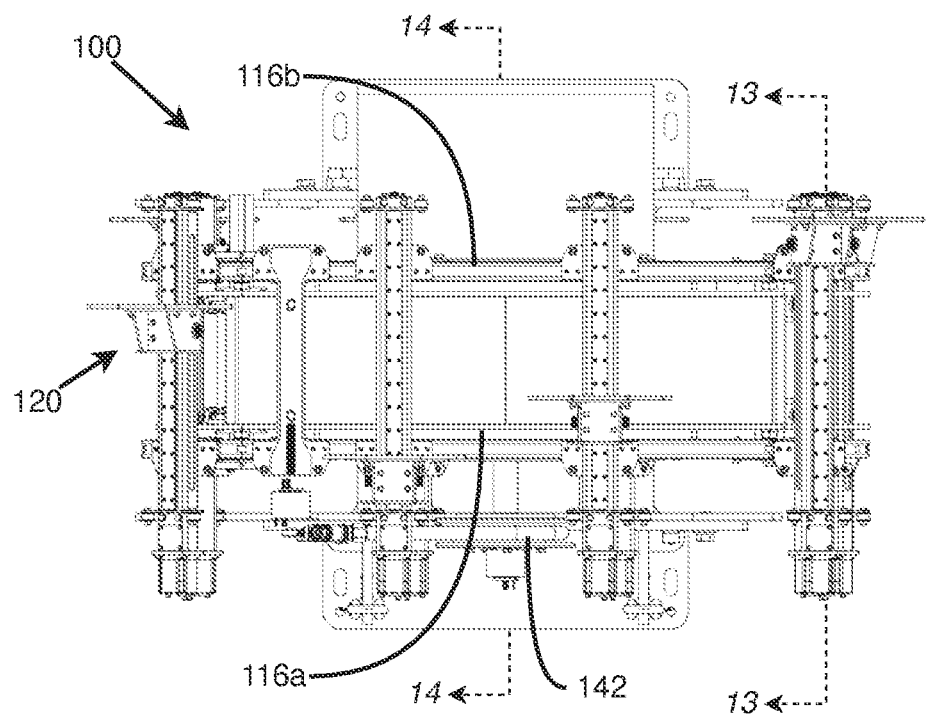
FIG. 11 is a plan view of the plank positioning mechanism of FIGS. 7 to 9.
Figure 12:
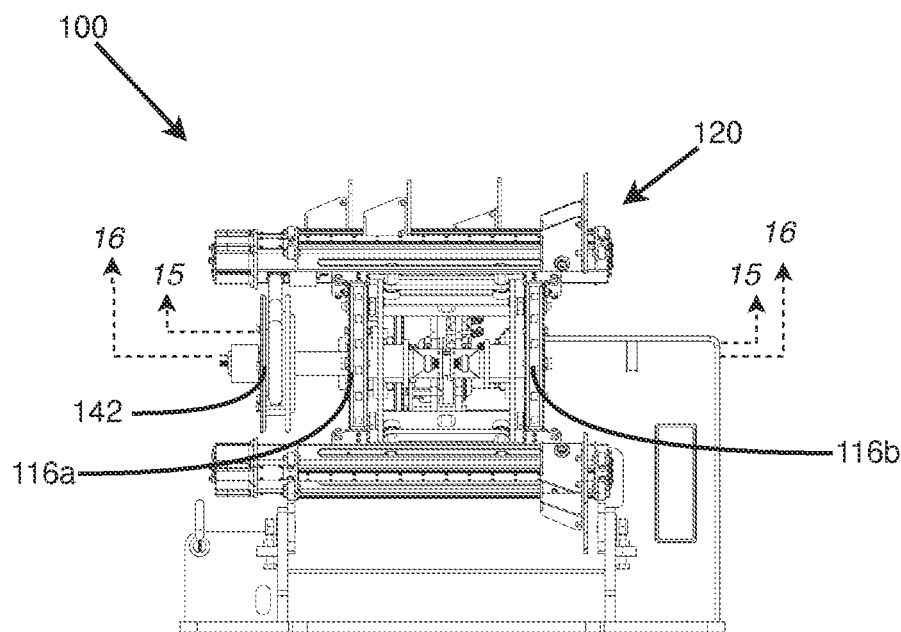
FIG. 12 is a back view of the plank positioning mechanism of FIGS. 7 to 9.
Figure 13:
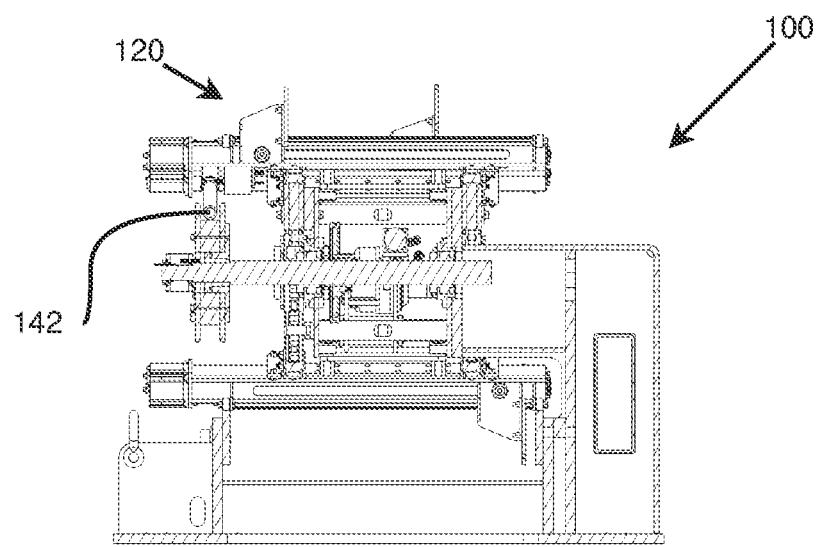
FIG. 13 is a cross-section back view of the plank positioning mechanism depicted on FIG. 11 along with cross-section lines 13-13.
Figure 14:
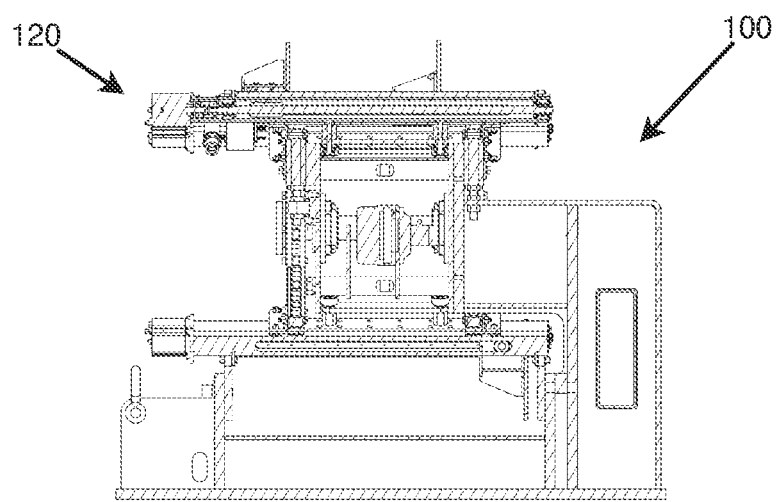
FIG. 14 is a cross-section back view of the plank positioning mechanism depicted on FIG. 11 along with cross-section lines 14-14.
Figure 15:
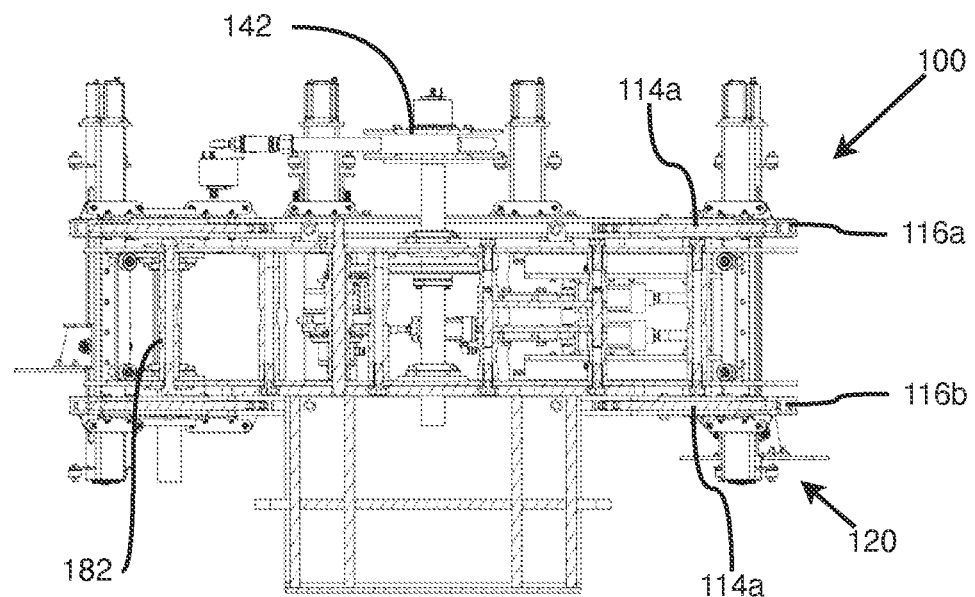
FIG. 15 is a cross-section top view of the plank positioning mechanism depicted on FIG. 12 with the cross-section plan being disposed respectively at the level of the top paddle assemblies.
Figure 16:
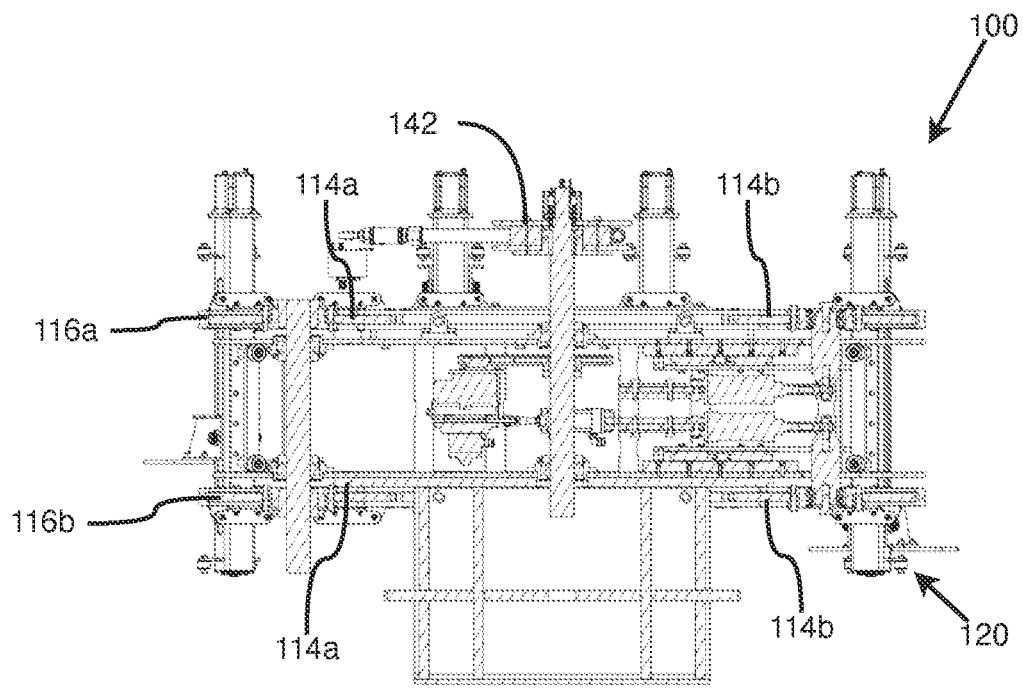
FIG. 16 is a cross-section top view of the plank positioning mechanism depicted on FIG. 12 with the cross-section plan being disposed at the level of the center of the power hub assembly.
Figure 17:
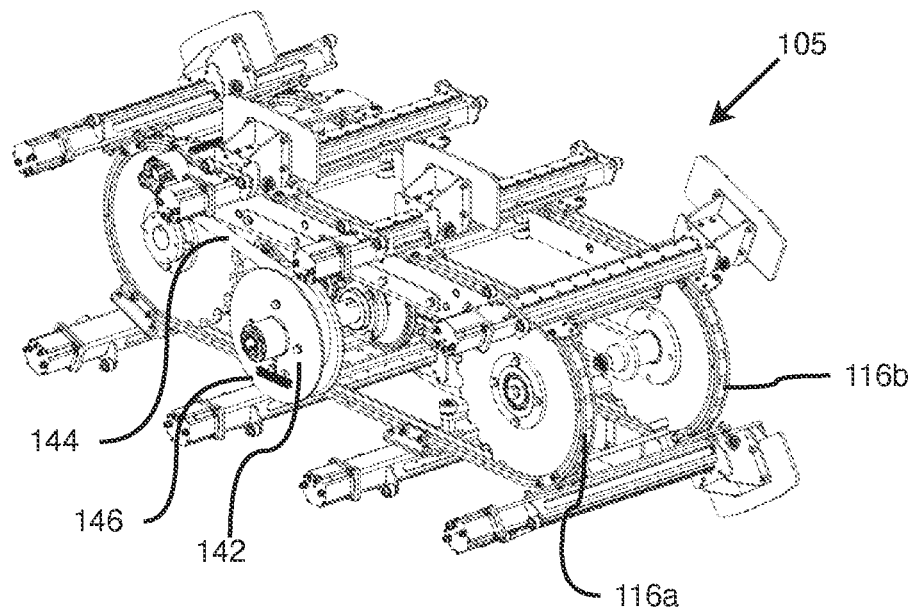
FIG. 17 is a perspective elevation view of a driving mechanism of the plank positioning mechanism of FIGS. 7 to 9.

Referring to FIGS. 8-9 and FIG. 17, the positioning mechanism 100 comprises a combination of a frame assembly 112 and driving mechanism 105 to be mounted to the frame assembly 112.

Figure 18:
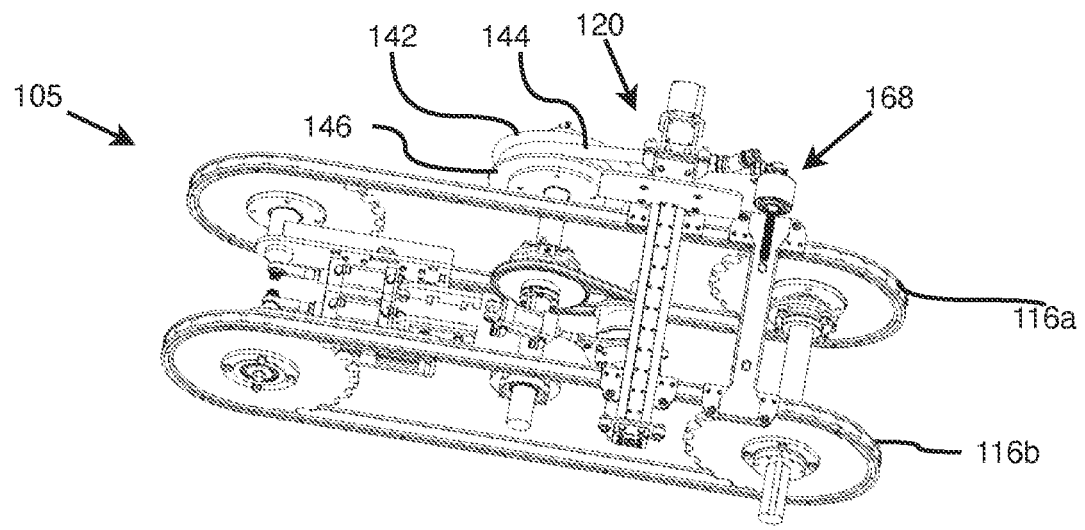
FIG. 18 is a perspective elevation view of the driving mechanism of FIG. 17, with a single first paddle assembly mounted thereto.
Figure 19:
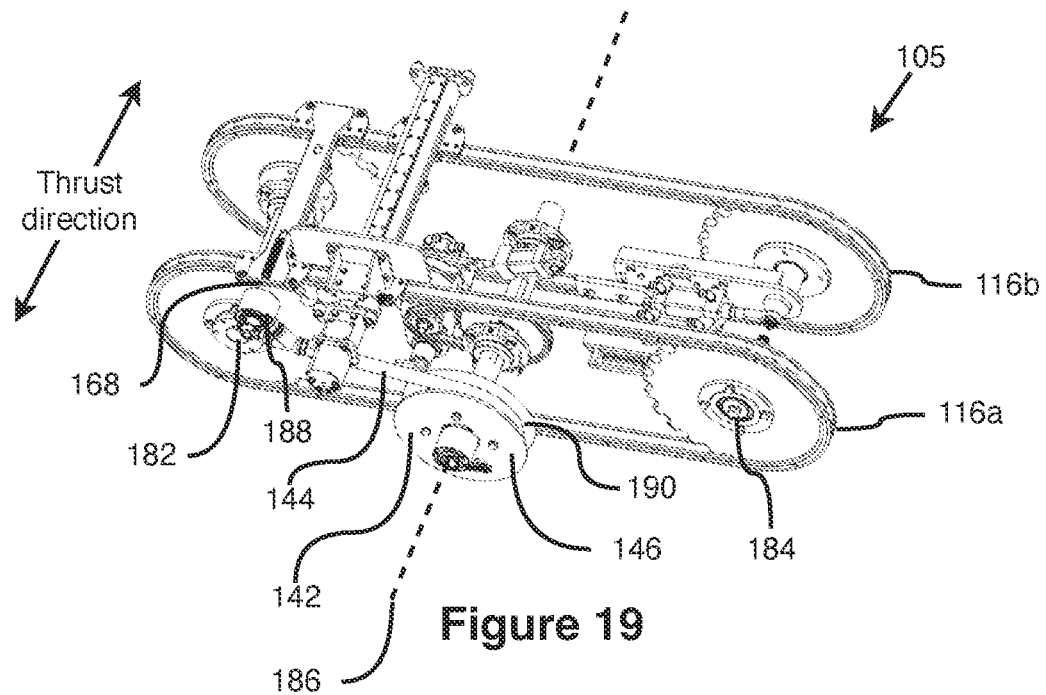
FIG. 19 is a perspective elevation view of the driving mechanism of FIG. 17, with a power anchorage mounted thereto.

Referring to FIGS. 18 and 19, the driving mechanism 105 has a single first paddle assembly 120 and a power anchorage 168 mounted to the chains 116. FIGS. 18 and 19 depict the paddle assembly 120 traveling side-by-side in a synchronous manner with the power anchorage 168.

Figure 20:
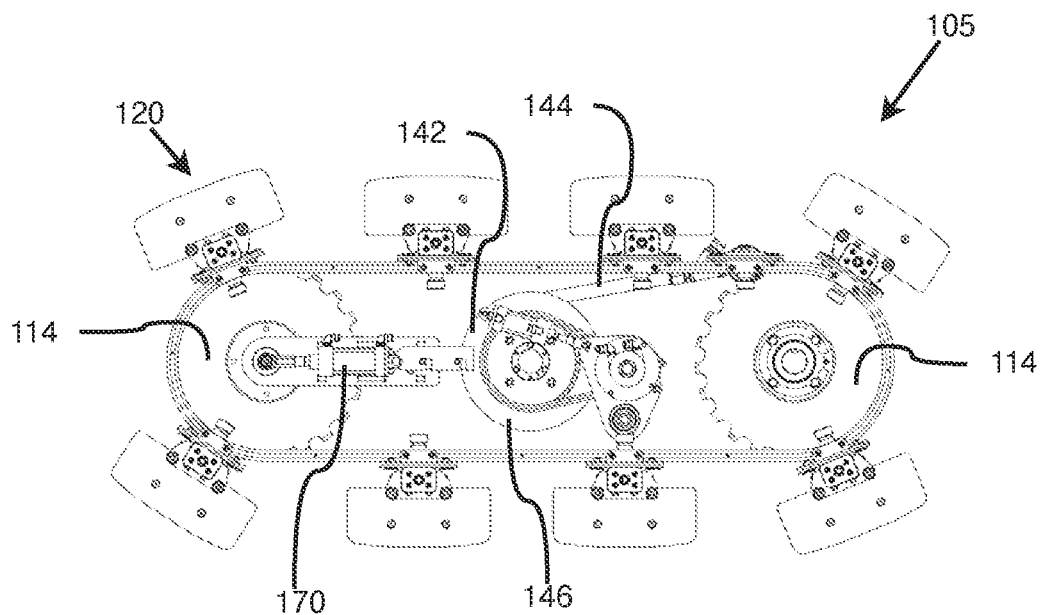
FIG. 20 is a side view of the driving mechanism of FIG. 17 from the lumber side.
Figure 21:
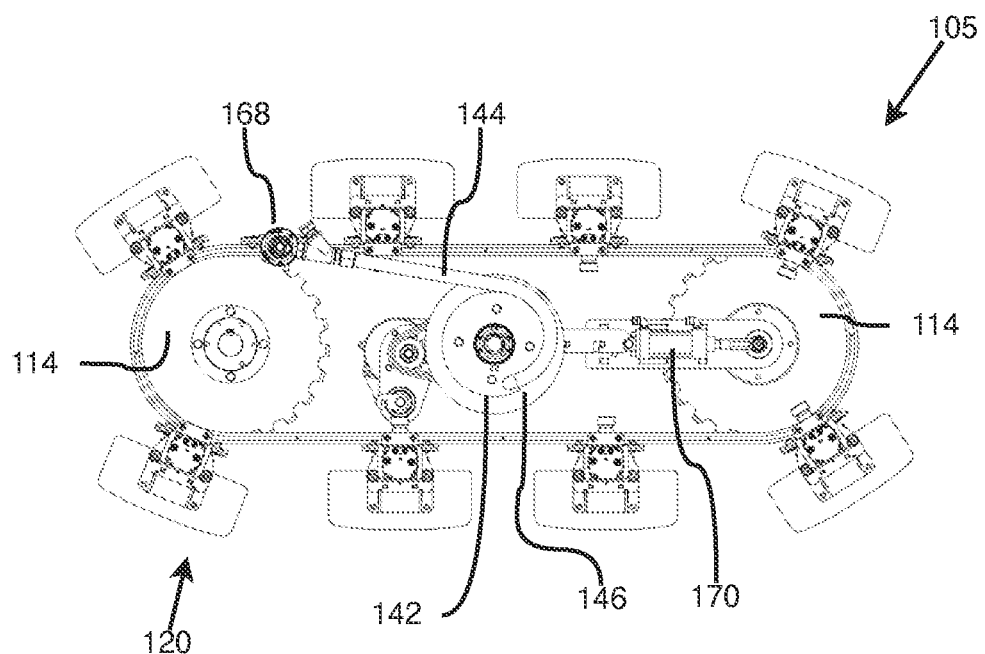
FIG. 21 is a side view of the driving mechanism of FIG. 17 from the catwalk side.
Figure 22:
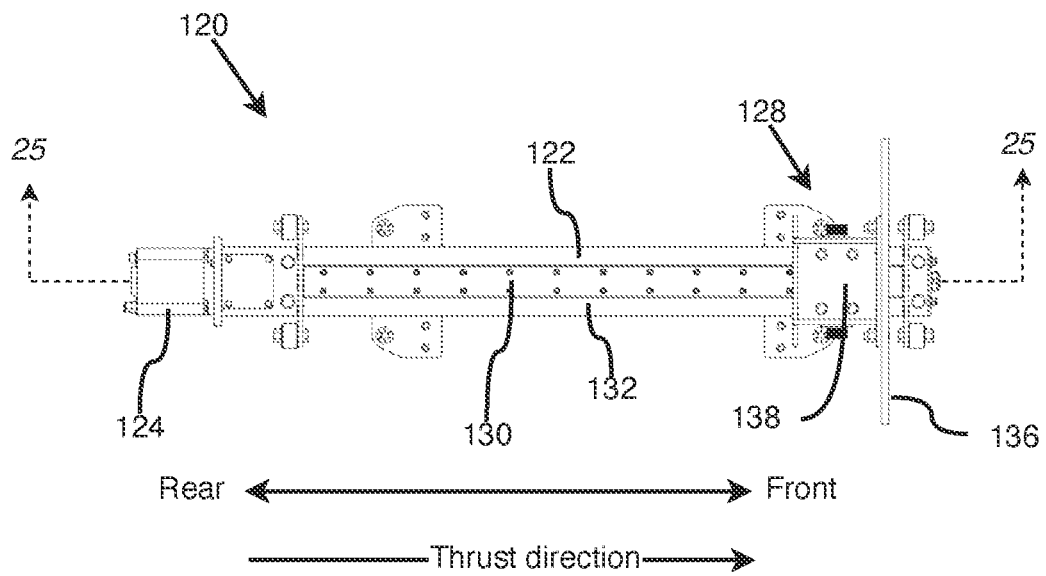
FIG. 22 is a plan view of a paddle assembly of the plank positioning mechanism of FIGS. 7 to 9 in accordance with an embodiment.

Referring additionally to FIGS. 19 to 21, the power hub assembly 142 comprises a main power cable 144 having a drum end 190 and a paddle end 188. The main power cable 144 is partially wound around a biased drum 146 rotatable about its axis 186, e.g., a spring-loaded drum, adapted to allow the paddle end 188 of the power cable 144 to extend away from the drum 186 as the power anchorage 168 it is connected thereto travels away from the drum 146 and to wind up looseness in the main power cable 144 as it moves closer to the drum 146.

Referring particularly to FIGS. 20 and 21, the driving mechanism 105 comprises a chain tensioning assembly 170 adapted to maintain a distance between the cogwheels 114, and in consequence tension on the chains 116 during the operation of the positioning mechanism 100.

Contemplated herein are other solution to maintain chains 116 at a desired tension, including use of tensioning additional cogwheel(s).

Not depicted is that the main power cable 114, after its connection to the power anchorage 168, divides into a power string travelling along the chain 116a and connecting all paddle assemblies 120. Thus, the power hub assembly 142 is adapted to power all the motors 124 (see FIGS. 22 to 25) of the paddle assemblies 120 mounted to the chains 116. Power cable is further adapted to transport command signals in an embodiment with motors 124 permanently powered.

Thus, the power hub assembly is adapted to power and command the paddle assemblies 120 regardless of their position.

Referring to FIGS. 22 to 25, each one of the paddle assemblies 120 comprises a body 122, typically a tube, mounted to the chains 116 and a reversible motor 124 located at the rear extremity of the body 122. The reversible motor 124 is connected to a driving screw 126 housed in the body 122. The driving screw 126 is driving a travelling assembly 128 through complementary threads present in traveling assembly 128. A rail 130 mounted to the top face 132 of the body 122 is adapted to guide the travel assembly 128 as it is driven frontward or rearward based on rotating direction of the motor 124. Windows 134 on the side of the body 122 provide clearance to connect the travelling assembly 128 to the driving screw 126 and for displacement of the connection members 140.

It is worth noting that regardless of the advantages of the described embodiment, the locations of the rail(s) 130 and window(s) 134 as their quantities are specific to the illustrated realization. Alternative realizations may, for instance. Comprises one or more window 134 on alternative face(s) of the body 122, on the same face than the rail 130 or not.

According to an alternative embodiment (not depicted), the mechanism driving the travel assembly 128, as an alternative to the driving screw 126, involves a set of pulleys and a toothed belt, wherein the travel assembly 128 is mounted directly or indirectly to the toothed belt. Therefore, though a motor 124 driving a pulley on which is mounted the toothed belt, the travel assembly 128 may be driven frontward and rearward in the thrust direction.

Figure 23:
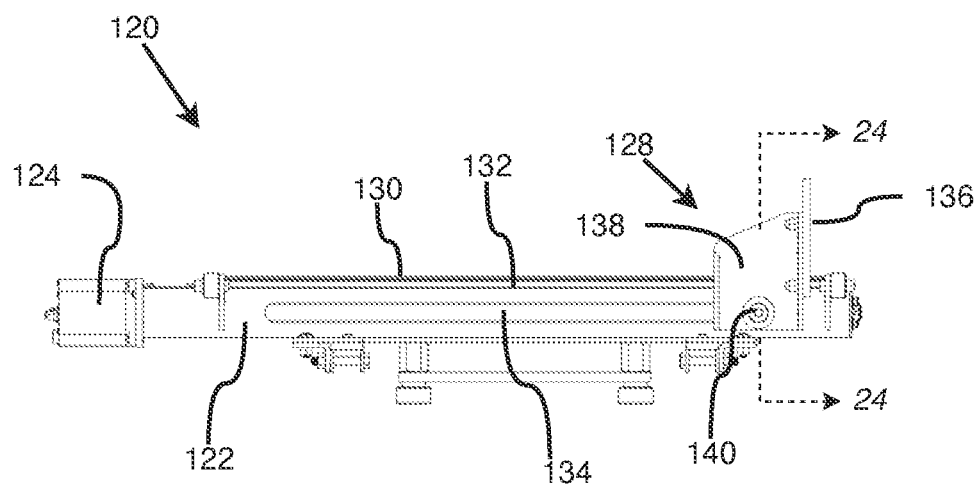
FIG. 23 is a side view of the paddle assembly of FIG. 22.
Figure 24:
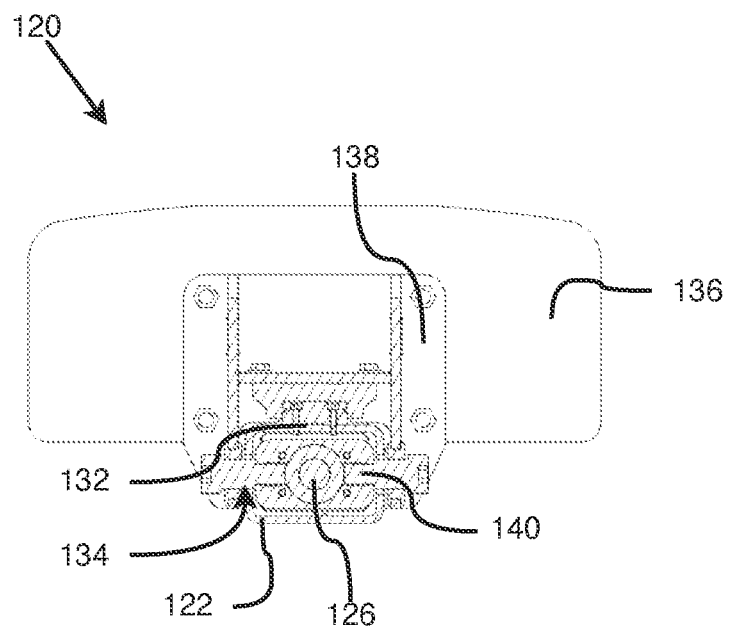
FIG. 24 is a cross-section view of the paddle assembly of FIG. 23 according to cross-section lines 24-24.
Figure 25:
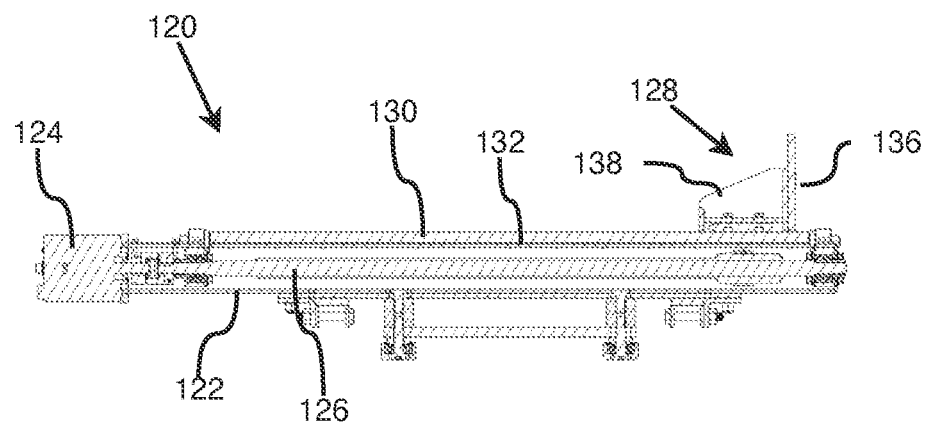
FIG. 25 is a cross-section view of the paddle assembly of FIG. 22 according to cross-section plan 25-25.
Figure 26:
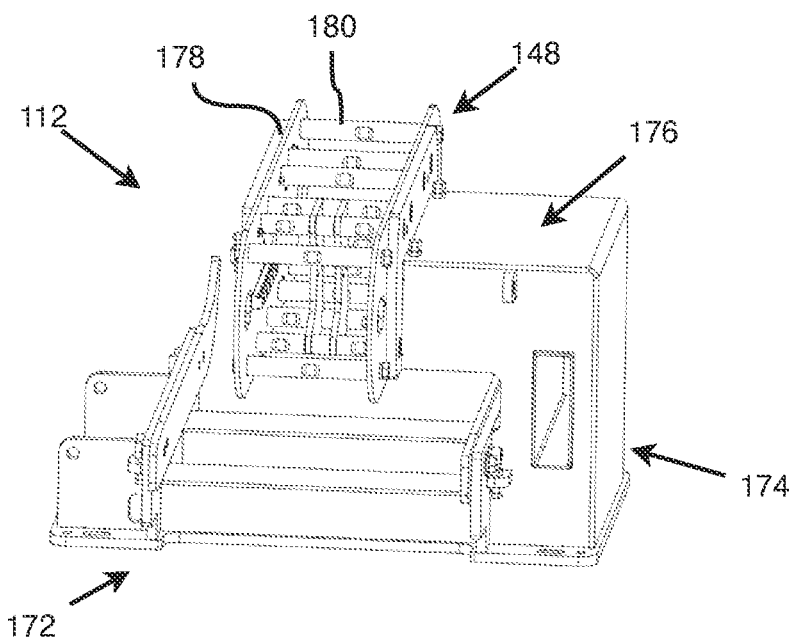
FIG. 26 is a perspective elevated view of the frame assembly of the plank positioning mechanism of FIGS. 7 to 9.
Figure 27:
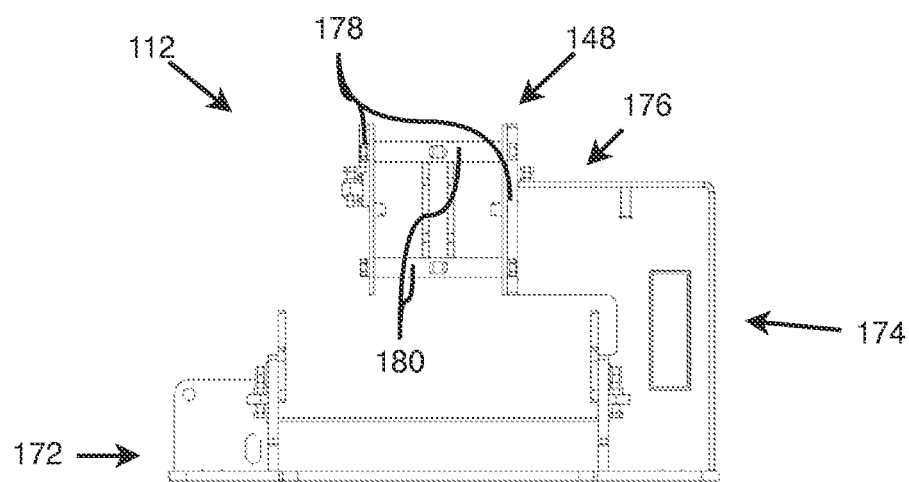
FIG. 27 is a front view of the frame assembly of the plank positioning mechanism of FIGS. 7 to 9.
Figure 28:
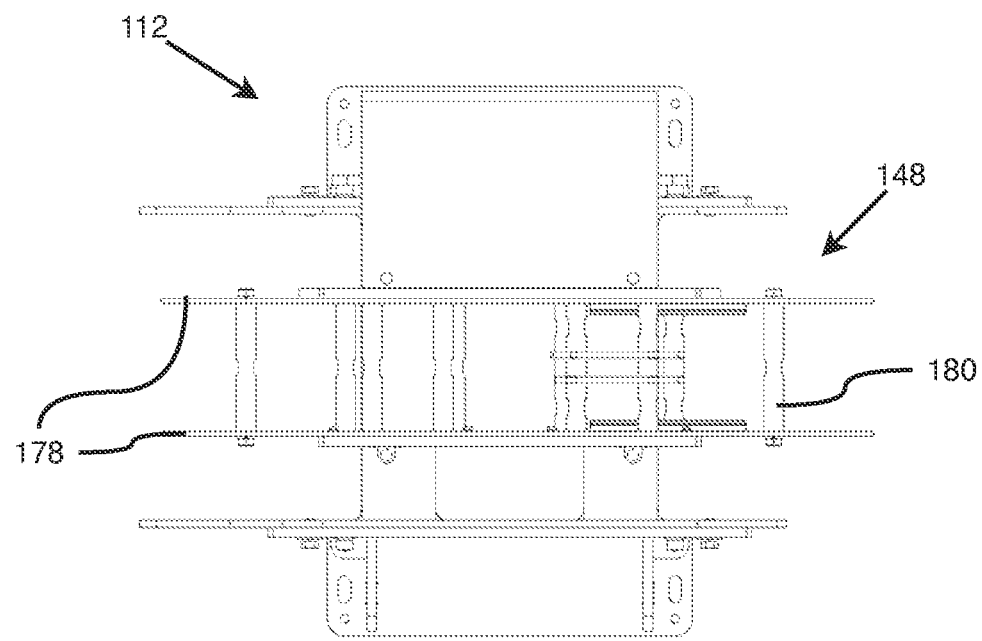
FIG. 28 is a plan view of the frame assembly of the plank positioning mechanism of FIGS. 7 to 9.
Figure 29:
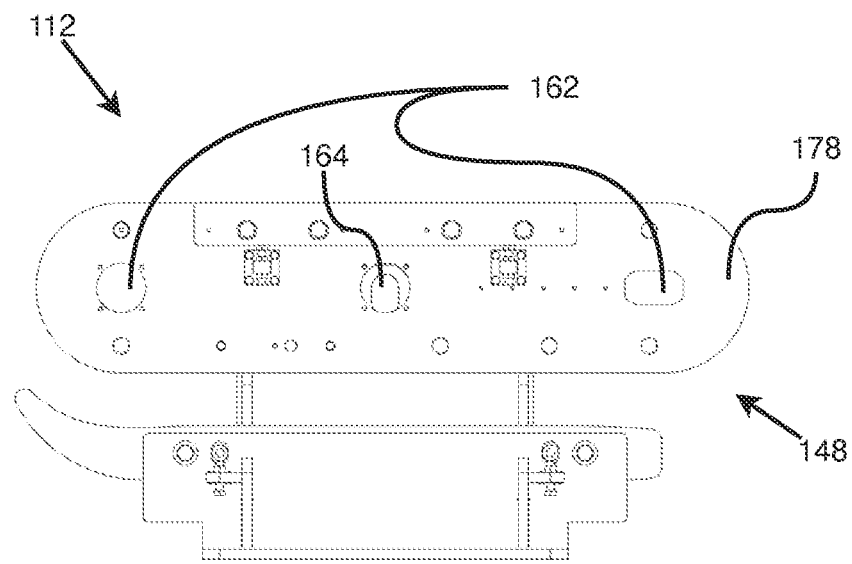
FIG. 29 is a side view of the frame assembly of the plank positioning mechanism of FIGS. 7 to 9.

Referring additionally to FIGS. 23 to 25, according to a first realization, the travelling assembly 128 comprises a support 138 on which is mounted a paddle surface 136 extending perpendicular to the board (see board 80, FIGS. 1 to 6), wherein abutment of the paddle surface 136 on the extremity of the board accompanied with the driving of the travelling assembly 128 toward to the board allows to abut and to thrust the board up to a target position that is transversally offset relative to its position when entering the complemented path 94.

Practically, the positioning mechanism 100 provides a cyclic path to the paddles assemblies 120 comprising the complementary path parallel and about the conveying surface, and an idle path (aka path portion not being part of the complementary path). The positioning mechanism 100 is adapted to have, during the idle path, the travelling assembly 128 being moved to its frontmost position to receive the extremity of the boards and to guide the boards into its final position. When in the complementary path 156, the travelling assembly 128 is driven rearward (toward and potentially beyond the rear chain 116a) to abut the extremity of the board, with its correction path 158 being completed to the target position before exiting the complementary path 156. Thus, boards leaving the complemented path 94, or in other words boards in the post-complemented path 92, are aligned.

According to pre-positioning of the boards on the wood board feeding system 80, different strategies are available for the travelling assembly 128 to provide guiding over longer or shorter transversal paths, and for the travelling assembly 128 to guide by transversally pulling, retaining, and/or pushing the boards into a final alignment position.

Therefore, individually driven travelling assemblies 128 are driven toward a target position 154 during their course on the complementary path 156 and are driven to an idle position, distant from the aligned position, during their course on the remainder of the cycle.

According to a realization (not depicted), the travelling assembly 120 comprises a grasping finger, preferably movable parallel to the complementary path 156. The grasping finger is adapted a) to grip the board; b) to move the board during the complementary path 156 to a target position, i.e., rearward or forward according to longitudinal direction of the travelling assembly 120, wherein the reversible motor 124 operating clockwise or anticlockwise determining the driving direction of the board; and c) to have the finger releasing the board before the end of the complementary path 156 to free the board before entering the post-complemented path 92.

Referring to FIGS. 1 and 17 and FIGS. 26 to 29, the frame assembly 112 is adapted to provide the structure to mount the driving mechanism 105 comprising the cogwheels 114, the chains 116, the conveying motor, the paddle assemblies 120 and the power hub assembly 142 parallel to the wood board feeding system 80, providing required rigidity and stability.

The frame assembly 112 comprises a base portion 172, a mast portion 174, a cantilever portion 176 and a carrying portion 148 mounted to the cantilever portion 176. The carrying portion 148 comprises a pair of support plates 178 connected through members 180. The carrying portion 148 is adapted to provide clearance therearound for the chains 116 and the paddle assemblies 120 to travel around, openings 162 for the axles of the cogwheels 114, and an opening 164 for mounting the power hub assembly 142 with the drum 146 and the main power cable 144 to travel outside the cantilever space extending between the two planes defined by the two chains 116.

It is worth mentioning that the carrying portion 148 comprising a pair of support plates 178 define a room in-between the support plates 178. The cogwheels 114 are mounted outside the room.

Figure 30:
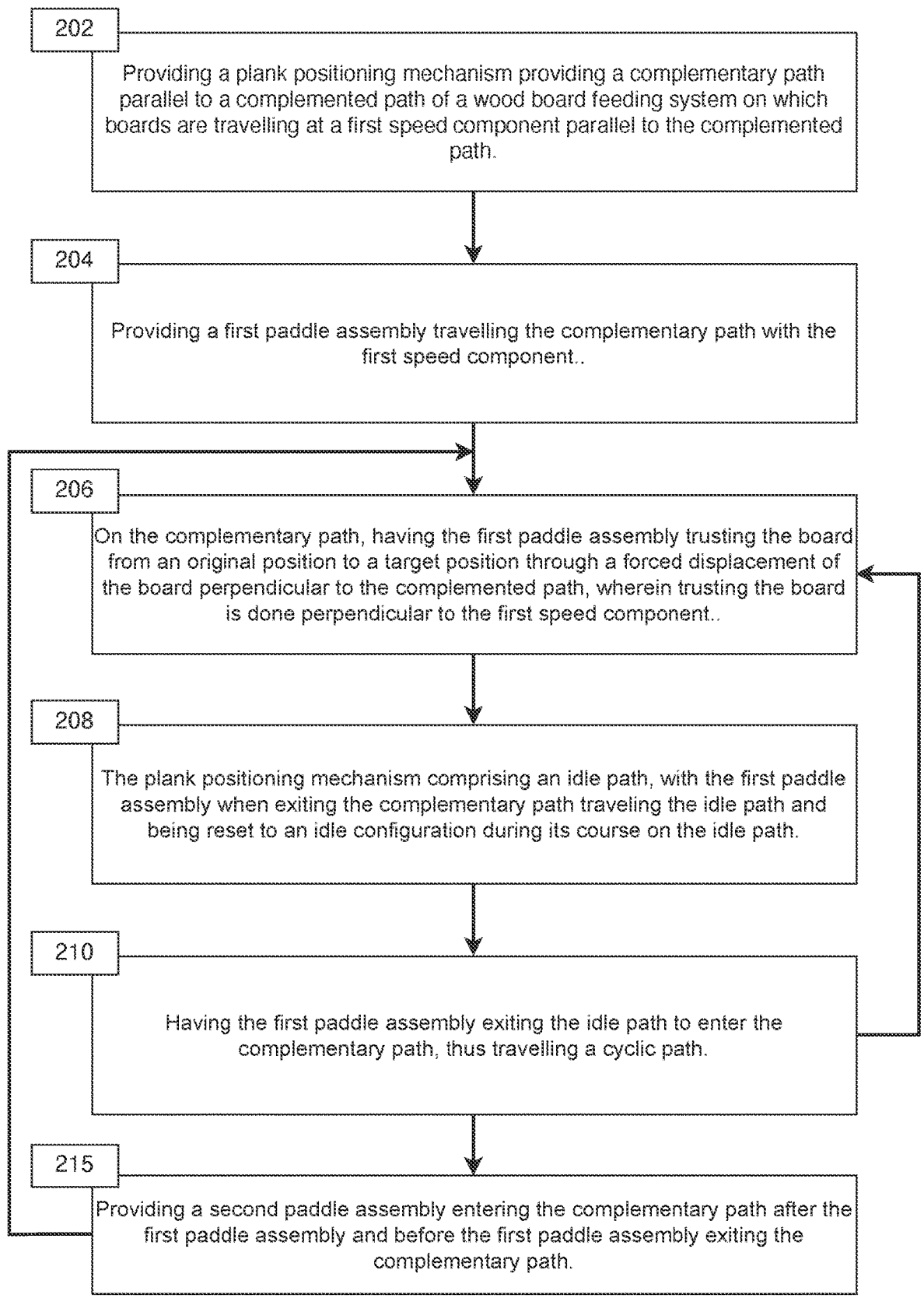
FIG. 30 is a flow chart depicting steps of a plank positing process in accordance with an embodiment.

Referring to FIG. 30, according to a perspective, there is method performed by a plank positioning mechanism comprising the following steps:

Step 202: Having a setup step comprising having a plank positioning mechanism providing a complementary path parallel to a complemented path of a wood board feeding system on which boards are travelling at a first speed component parallel to the complemented path.

Step 204: Providing a first paddle assembly travelling the complementary path with the first speed component.

Step 206: On the complementary path, having the first paddle assembly thrusting the board from an original position to a target position through a forced displacement of the board perpendicular to the complemented path, wherein thrusting the board is done perpendicular to the first speed component.

Step 208: The plank positioning mechanism comprising an idle path, with the first paddle assembly when exiting the complementary path traveling the idle path and being reset to an idle configuration during its course on the idle path.

Step 210: Having the first paddle assembly exiting the idle path to enter the complementary path, thus travelling a cyclic path.

Optionally, the method comprises Step 215: Providing a second paddle assembly entering the complementary path after the first paddle assembly and before the first paddle assembly exiting the complementary path, thereby thrusting a plurality of boards independently from each other.

Accordingly, the method provides a solution wherein paddle assembly/assemblies, hereinafter assemblies, are travelling synchronously and parallel to boards on a complementary path, and wherein the paddle assemblies are individually movable between an idle position and a target position, said displacement being perpendicular to the complementary path. Thereby, the boards are thrusted to a target or aligned position during their course along the complementary path.

The method further provides an idle path complementary to the complementary path, wherein the paddle assemblies are individually moved to an idle position.

The method contemplates that the combination of the complementary path and the idle path forms a cyclic path.

While preferred embodiments have been described above and illustrated in the accompanying drawings, it will be evident to those skilled in the art that modifications may be made without departing from this disclosure. Such modifications are considered as possible variants comprised in the scope of the disclosure.

The invention claimed is:

1. A plank positioning mechanism adapted to thrust a plank traveling in a conveyor traveling direction on a conveyor in a thrust direction perpendicular to the conveyor traveling direction, the plank positioning mechanism, comprising:
conveying means traveling parallel to the conveyor traveling direction, the conveying means traveling independently to the conveyor; and
a plurality of paddle assemblies mounted to the conveying means, each one of the paddles assemblies comprising
a movable part adapted to be movable in the thrust direction; and
a motor adapted to drive the movable part in a first direction and a second direction, the thrust direction being along one of the first and the second direction,
wherein the movable part is adapted to thrust the plank in the thrust direction while the plank being conveyed by the conveyor.

2. The plank positioning mechanism of claim 1, wherein at least one of the plurality of paddle assemblies comprises a driving means connecting the motor to the movable part.

3. The plank positioning mechanism of claim 2, wherein the driving means comprises a driving screw having an axis, wherein rotation of the screw around its axis drives the movable part parallel to the axis and moves the movable part in the thrust direction.

4. The plank positioning mechanism of claim 3, wherein at least one of the plurality of assemblies comprises a body extending in the thrust direction, with the screw extending in the body.

5. The plank positioning mechanism of claim 4, wherein at least one of the plurality of paddle assemblies comprises a guiding rail mounted to the body and extending in the thrust direction, and the body comprises at least one opening extending in the thrust direction.

6. The plank positioning mechanism of claim of claim 5, wherein at least one of the plurality of paddle assemblies comprises a travelling assembly comprising the movable part, the travelling assembly being movably mounted to the guide rail and connected to the screw through the at least one opening.

7. The plank positioning mechanism of claim 6, wherein the body comprises a rear end with the motor being mounted to the rear end of the body.

8. The plank positioning mechanism of claim 1, further comprising a frame assembly having a base portion, a mast portion, a cantilever portion, and a carrying portion mounted to the cantilever portion around which travels the conveying means, wherein configuration of the base portion, the mast portion, and the cantilever portion provides clearance between the carrying portion and the base portion for at least one of the plurality of paddle assemblies to travel in-between.

9. The plank positioning mechanism of claim 1, wherein the conveying means comprises a pair of chains traveling parallel to each other.

10. A plank positioning mechanism adapted to thrust a plank traveling in a conveyor traveling direction on a conveyor in a thrust direction perpendicular to the conveyor traveling direction, the plank positioning mechanism, comprising:
conveying means traveling parallel to the conveyor traveling direction; and
at least one paddle assembly mounted to the conveying means, comprising
a movable part adapted to be movable in the thrust direction;
a motor adapted to drive the movable part in the thrust direction,
a frame assembly having a base portion, a mast portion, a cantilever portion, and a carrying portion mounted to the cantilever portion around which travels the conveying means,
wherein the movable part is adapted to thrust the plank in the thrust direction while the plank being conveyed by the conveyor, and
wherein configuration of the base portion, the mast portion, and the cantilever portion provides clearance between the carrying portion and the base portion for the paddle assembly to travel in-between.

11. The plank positioning mechanism of claim 10, wherein the conveying means have a traveling path, the plank positioning mechanism further comprising a power hub assembly extending from the mast portion within a periphery defined by the traveling path of the conveying means.

12. The plank positioning mechanism of claim 11, wherein the power hub extends in the thrust direction.

13. The plank positioning mechanism of claim 12, wherein the power hub comprises a drum rotatable relative to an axis in the thrust direction, and a power cable having a drum end connected to the drum and a paddle end mounted to a power anchorage mounted to the conveying means, thereby conveyed by the conveying means.

14. The plank positioning mechanism of claim 13, wherein the at least one paddle assembly comprises a first paddle assembly and a second paddle, wherein the first paddle assembly and the second paddle assembly are connected to the paddle end of the power cable.

15. A plank positioning mechanism adapted to thrust a plank traveling in a traveling direction on a conveyor in a thrust direction perpendicular to the conveyor traveling direction, the plank positioning mechanism comprising:
a pair of chains traveling parallel to the conveyor traveling direction, the pair of chains travelling independently to the conveyor; and
a plurality of paddle assemblies mounted to the pair of chains, comprising
a movable part adapted to be movable in the thrust direction; and
a motor adapted to drive the movable part in a first direction and a second direction, the thrust direction being along one of the first direction and the second direction,
wherein the movable part is adapted to thrust the plank in the thrust direction while the plank being conveyed by the conveyor.

16. The plank positioning mechanism of claim 15, wherein each of the plurality of paddle assemblies comprise a driving means connecting the motor to the movable part.

17. The plank positioning mechanism of claim 16, wherein the driving means comprises a driving screw having an axis, wherein rotation of the screw around its axis drives the movable part parallel to the axis and moves the movable part in the thrust direction.

18. The plank positioning mechanism of claim 17, wherein at least one of the plurality of paddle assemblies comprises a body extending in the thrust direction, with the screw extending in the body.

19. The plank positioning mechanism of claim 18, wherein at least one of the plurality of paddle assemblies comprises a guiding rail mounted to the body and extending in the thrust direction, and the body comprises at least one opening extending in the thrust direction.

20. The plank positioning mechanism of claim of claim 19, wherein at least one of the plurality of paddle assemblies comprises a travelling assembly comprising the movable part, the travelling assembly being movably mounted to the guide rail and connected to the screw through the at least one opening.

* * * * *